Aug. 14, 1923.
N. C. OVAITT
1,464,683
COUNTER ATTACHMENT FOR ACCOUNTING MACHINES
Original Filed Oct. 13, 1911    4 Sheets-Sheet 1
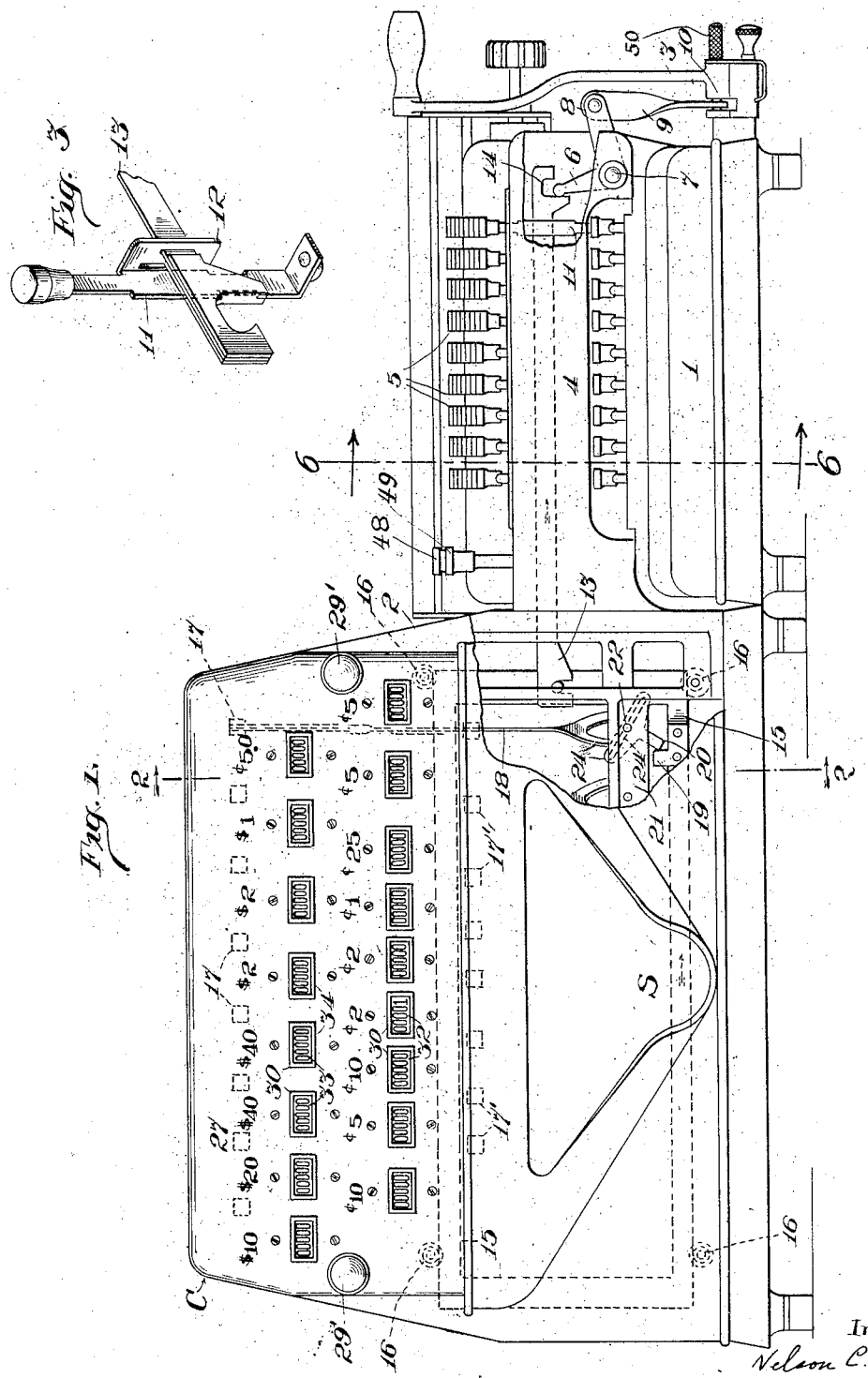
Inventor
Nelson C. Ovaitt
by Offield Towle Graves & Offield
Attorneys.

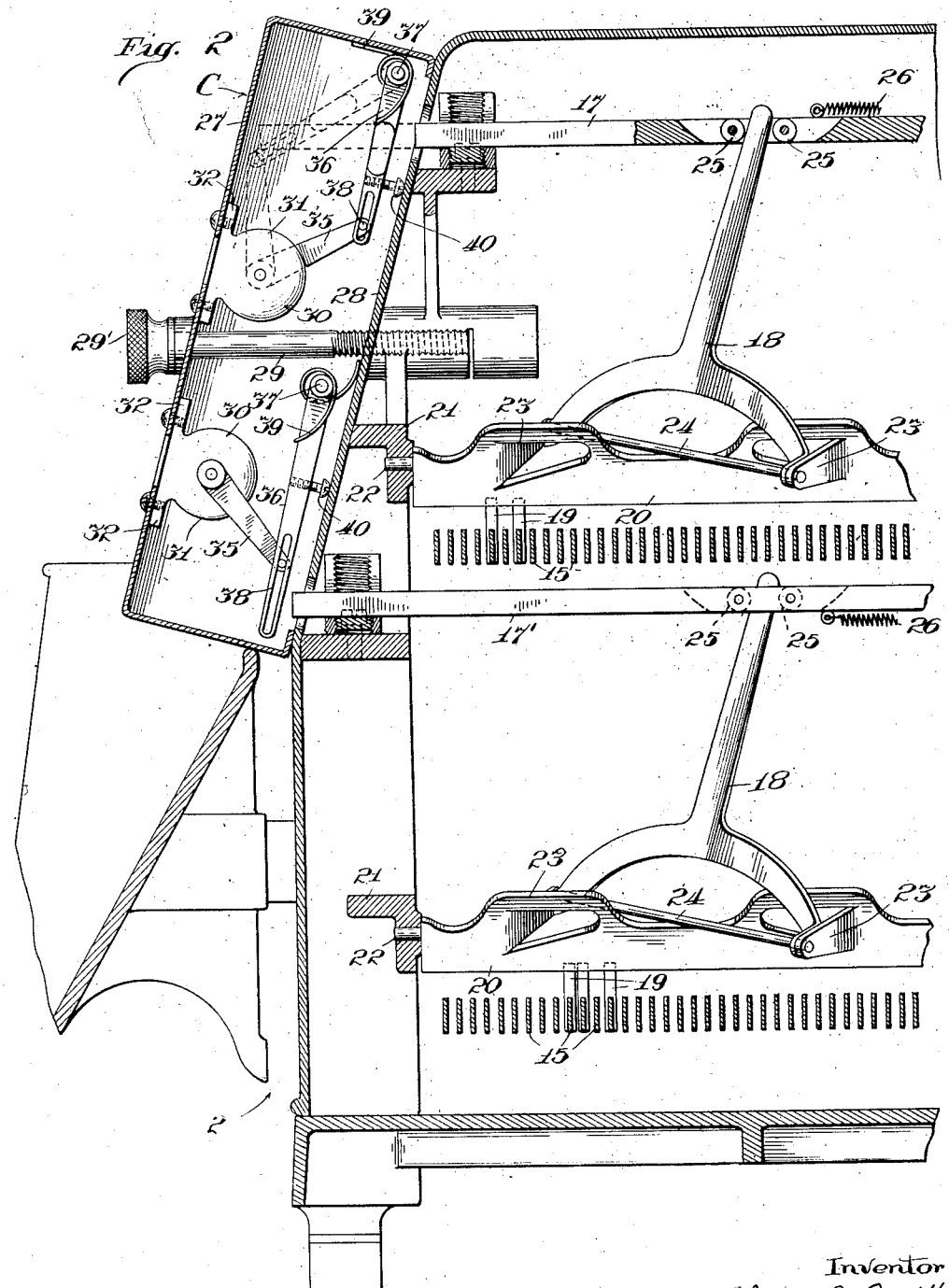

Aug. 14, 1923.
N. C. OVAITT
1,464,683
COUNTER ATTACHMENT FOR ACCOUNTING MACHINES
Original Filed Oct. 13, 1911    4 Sheets-Sheet 3
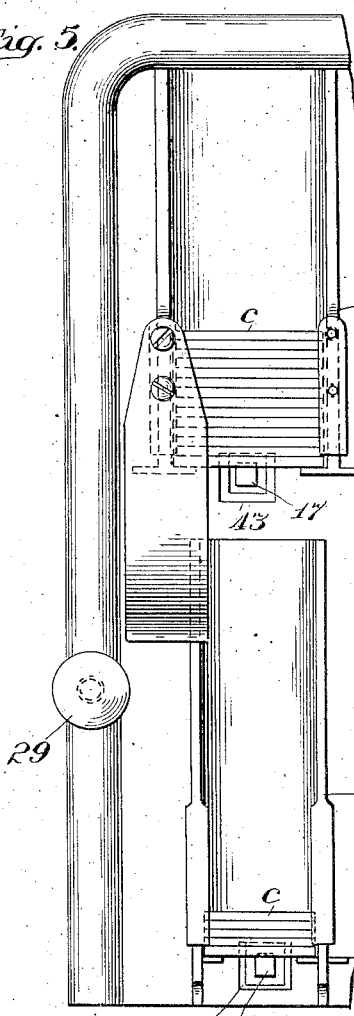
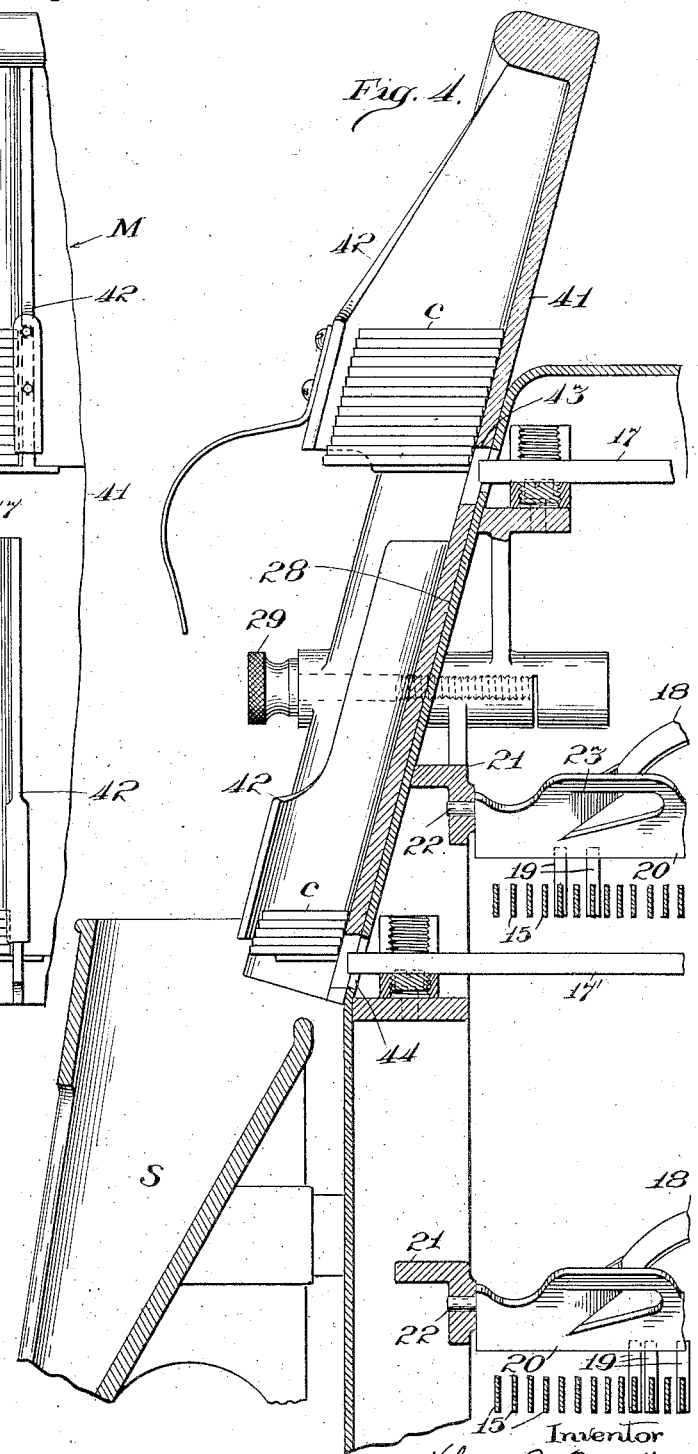

Aug. 14, 1923.
N. C. OVAITT
1,464,683
COUNTER ATTACHMENT FOR ACCOUNTING MACHINES
Original Filed Oct. 13, 1911    4 Sheets-Sheet 4
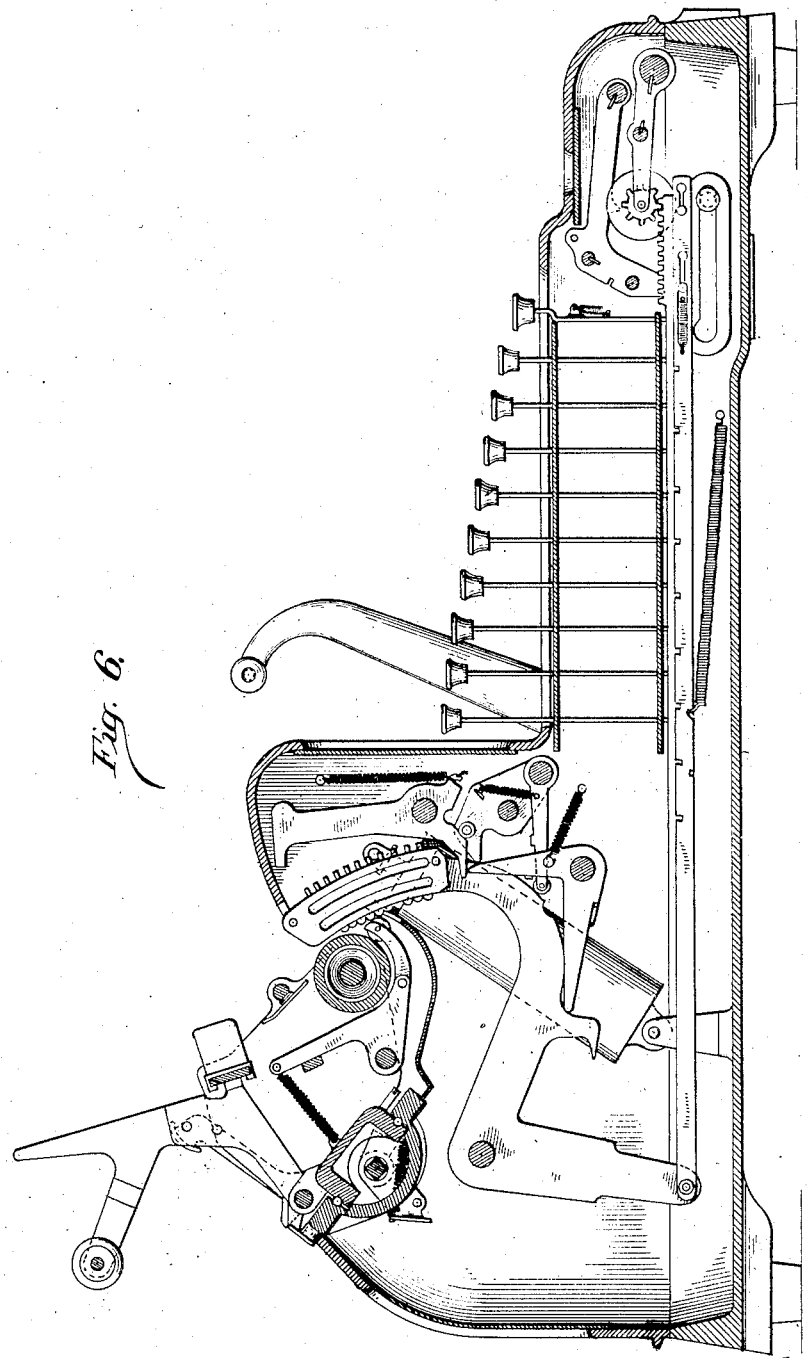

Patented Aug. 14, 1923.

1,464,683

UNITED STATES PATENT OFFICE.

NELSON C. OVAITT, OF DETROIT, MICHIGAN, ASSIGNOR, BY MESNE ASSIGNMENTS, TO PAYOMETER COMPANY, A CORPORATION OF MICHIGAN.

COUNTER ATTACHMENT FOR ACCOUNTING MACHINES.

Continuation of application Serial No. 654,442, filed October 13, 1911. This application filed July 2, 1917. Serial No. 178.116.

*To all whom it may concern:*

Be it known that I, NELSON C. OVAITT, a citizen of the United States, residing at Detroit, in the county of Wayne and State of Michigan, have invented certain new and useful Improvements in Counter Attachments for Accounting Machines, of which the following is a specification.

This invention relates to improvements in counter attachments for accounting machines, and has for its salient objects,—to provide a counter attachment for an ordinary accounting machine having adding, listing, and recording functions, whereby the operator, while performing the ordinary accounting functions of adding, listing, and recording, may at the same time determine the numbers and classes of the individual coin or currency denominations necessary to make up the particular item or items added, listed, and recorded by the accounting machine; to provide a mechanism of the class described capable of being applied to or disconnected from an ordinary standard accounting machine of the class described; to provide a construction which may be almost instantly associated with or disassociated from the accounting machine; to provide a set of counters organized into a group so as to be handled as a unit and adapted to be substituted for the coin chutes of a payograph or coin-dispensing machine, the counters being so associated with the coin ejectors when in place that the movement of the several ejectors will be recorded and counted, thereby enabling the operator to determine exactly how many coins and what various denominations will be required to take care of a given pay-roll; to provide a construction which utilizes for its several counting units, counter units already upon the market and well known; and, in general, to provide an improved mechanism of the character referred to.

To the above ends, the invention consists in the matters hereinafter described and more particularly pointed out in the appended claims.

In the accompanying drawings—

Fig. 1 is a front elevation of a combined calculating machine and payograph, equipped with my present invention, certain parts of the front of the machine being broken out to expose the inner construction;

Fig. 2 is a vertical cross-sectional view taken approximately on line 2—2 of Fig. 1 and looking in the direction of the arrows, showing particularly the manner in which the counters are associated with the ejector mechanism;

Fig. 3 is a perspective view of the upper portion of one of the keys, showing particularly its connection with an actuating link;

Fig. 4 is a view similar to Fig. 2, but showing only the front and upper part of the ejector structure and showing the coin magazines applied thereto; and Fig. 5 is a front elevational view of one end of a coin magazine.

Fig. 6 is a typical section through the adding machine taken on the line 6—6 of Fig. 1.

A brief description of the general construction and operation of the combined calculating and payograph machine is necessary to a comprehension of the counter mechanism forming the chief feature of the present invention. 1 designates as a whole a counting machine of a well known type, known as a "No. 324 Burroughs visible machine", said machine having the usual adding, listing, and recording functions, whereby the operator, after having depressed keys corresponding to the item desired to be set up, subsequently operates a crank which automatically prints and lists the item on the record sheet, and totals or adds the item set up to the previous total. The operator may of course record and list the total on the record sheet at any time by suitably manipulating the accounting machine in a well known manner and operating the crank a second time. 2 designates as a whole the payograph attachment shown complete and operatively associated with the calculating machine. The counter mechanism C is adapted to be substituted for the coin magazines M, which form a detachable part of the payograph.

The calculating machine comprises the usual complete set of keys, nine in a row from front to rear, each of these keys being as usual arranged to be locked in depressed position when operated and until released by the operating movement of the main crank handle 3. The main frame of the payograph has a ledge-like extension 4 in which is arranged a second bank of keys 5 corresponding precisely in number and arrangement to the bank of keys of the calculating machine proper, the lower ends or stems of the upper set of keys being adapted to engage and depress the lower keys when the upper keys are operated. This arrangement enables the two machines to be operated, as to the key setting, as a single machine.

Arranged to extend from front to rear inside of the ledge frame 4 and near the right-hand end thereof, is a web-like rocking lever 6 pivoted on an axis 7 and provided with a right-angled rigid extension or arm 8 which connects by means of a link 9 with a short crank extension 10 of the main lever 3. These interconnections are such that upon the pulling forwardly of the main crank 3, the upstanding part of lever 6 is oscillated from left to right, the link connections affording positive movement of the lever 6 whichever way the crank 3 is turned.

In the particular machine illustrated, only the first four rows of keys, representing cents, tens of cents, dollars, and tens of dollars, are concerned in the operation of the payograph, the machine being organized to pay amounts up to $99.99 only. Each key of the four rows of the upper bank of keys has operatively associated with it a corresponding link 13 whereby movement is transmitted to the ejector-controlling mechanism of the payograph. To this end, each of these keys carries a bracket-like lug 12 (see detail Fig. 3) through which extends the body of the thin plate bar 13, thereby insuring a positive up-and-down movement of the bar with the key stem. Each bar is provided in its under side with a notch 14 (see Fig. 1), adapted, when the bar is depressed, to engage the upper edge of the web lever 6, said notch being so formed as to insure positive end-wise movement of the bar with the web lever in both directions. The left-hand end of each bar 13 is pivotally engaged with a rectangular skeleton plate-frame 15, shown partly in full lines and partly dotted, as in Fig. 1. These skeleton frames 15 are arranged side by side, spaced slightly apart, and mounted on rollers 16, there being one such frame for each operating bar 13.

Referring now to Fig. 2, 17 and 17′ designate one each of the upper and lower sets of ejectors; and referring back to Fig. 1, it will be observed that there are two horizontal rows or tiers of these ejectors. Each ejector is reciprocated forwardly and backwardly by means of a corresponding yoke lever 18, and these yoke levers each form an element of a mechanism now to be described, which is actuated by the to-and-fro movement of the frames 15. Each frame 15 has rigidly mounted upon both its lower and upper portions one or more lugs 19 (see Fig. 1) adapted to engage and oscillate corresponding rock bars 20. These rock bars 20 are each pivoted between front and rear side frame members 21 (the rear end not being shown, but being similar to the front) on trunnions 22, and the lower edges of these rock bars extend across the entire set of frames 15 and in proximity to the upper edges of the respective top and bottom bars of said frames 15. Each rock bar 20 has struck out from its opposite sides, about in alinement with its axis, ears 23, 23, and the lower ends of the yoke levers 18 are pivotally mounted between these ears on pintle rods 24. The parts thus organized form a species of gimbal joint, the arrangement being such that an oscillating movement of the rock bar 20 imparts a movement at right-angles, i. e., from front to rear, or vice versa, of the upper end of the yoke lever 18. The several yoke levers extend through slots in the corresponding ejectors, anti-friction rollers 25 being arranged in these slots to engage the sides of the yoke levers and minimize the friction. Each ejector bar 17 and 17′ is provided with a retracting spring 26 attached to a rear part of the frame and of sufficient strength to insure the return of the ejector and connected parts.

Describing now the counter mechanism, 27 designates a suitable frame, shown in the present instance as taking the form of a box open at its rear side and adapted to be rigidly secured against the front face 28 of the coin chute ledge by means of a pair of screw studs 29 provided with thumb nuts 29′. Against the inner face of the front side of the frame 27 are fixedly mounted two rows of ordinary Veeder counters, severally designated 30. The type of these Veeder counters used has a cylindric barrel or casing 31 and face plate 32 through which is formed a sight opening 33. The face plate is secured to the front face of the casing 27, as shown clearly in the drawings, the casing being of course provided with registering apertures 34. Each counter is provided with an operating crank 35, and in the preferred arrangement shown, the ends of these cranks connect with pivotally mounted swinging links 36 suspended on suitable supporting rods 37 in the frame. The connection between crank and link is a slot and pin connection, as indicated at 38, and the links 36 are respectively arranged to depend into the paths of the forward ends of the several ejectors 17 and 17′. The parts are so adjusted that the full throw of the ejector oscillates the crank of the counter through the proper arc to tally 1 on the counter. The several links 36 are automatically retracted by suitable retraction springs 39. Suitable adjusting screws 40 are provided, one in each link, adapted to limit the return movement and thereby regulate the throw of the crank of the counter.

In Figs. 4 and 5 the detachable coin magazine structure is shown. The back wall of the enclosing frame 41 of this structure is adapted to seat against the face 28 of the ejector mechanism structure, and screws 29 are adapted to secure the structure in place in the same manner as the counter structure M is held in place. Upper and lower tiers of coin chutes 42 are provided in the frame 41 for containing stacks of coins c, the back wall of the frame 41 having an upper row of slots 43, through which slots the upper ejector bars 17 may pass to eject coins from the upper chutes. Through the lower slots 44 the lower ejector bars 17' may pass to eject coins from the chutes of the lower tier, the ejected coins falling into the spout s from which they are delivered to suitable receptacles.

The operation of the apparatus will be clear from a very brief description

Assume the operator is preparing to draw his coin from the bank preparatory to paying off his pay-roll. It is customary to require pay-masters to draw as exactly as possible the amount of money required to meet the pay-roll. With the present machine, the operator places a recording sheet in the calculating machine and proceeds to set up the first employee's amount listed in his pay-roll. That is to say, he depresses the several keys 5 corresponding to the amount to be set up, and in so doing engages the several corresponding links 13 with the web lever 6, and at the same time depresses the corresponding keys of the calculating machine proper. He next pulls forwardly the main crank 3, thereby recording the amount of the item set up on the recording sheet, and operating the counter mechanism as follows: As the web lever oscillates to the right, the several links 13 draw over in the same direction the corresponding actuating frames 15, and these frames in turn actuate the rocking levers 20 and connected yoke levers 18, thus impelling forwardly the several ejectors pertaining to the particular keys operated. As the ejectors move forwardly, they operate the corresponding counters, stepping each of the latter so operated forward one tally. It should have been stated that before commencing to make up the payroll, the operator makes a memorandum of the numbers at which the several Veeder counters stand, so that his subsequent total may be arrived at by simple subtraction. That is to say,—the simple form of Veeder counter preferred is not provided with means for restoring the mechanism to zero, but of course counters that are so organized can be adopted if preferred. The operation of recording the first item of the pay-roll will tally 1 on each counter so actuated, thus showing both the total number of coins and the kind of coins which the payograph will subsequently eject to make up that amount or item. Upon the return movement of the main crank, the actuating mechanism is restored to its normal condition throughout, the connecting links 13 being automatically lifted out of engagement with the web lever by the rise of the calculating machine keys, which, as usual, are released by the actuation of the main crank. Each succeeding item is set up and taken off in the same way. The calculating machine, performing its usual functions, records the separate items and also adds them, so that at the end of the pay-roll the operator can strike off the total. This tells him exactly the amount of cash required to meet his pay-roll. By referring to the several counters and making the proper subtractions, and comparing the same with the numbers at which they originally stood before commencing to make up the pay-roll, the operator is able to determine exactly how many coins of each denomination will be required for his pay-roll. The counter attachment can then be removed, leaving the machine in readiness to receive the coin magazines and to be used for actually paying off.

It should be understood that the accounting machine is provided with the usual clearing key by which the operator may unset the keys, if by any chance an incorrect item be set up. When such a mistake is made, the operator presses the clearing key of the accounting machine, instead of operating the crank to list and record the item, whereupon the keys spring back into their normal position, unsetting the selected devices both of the accounting machine and the counter attachment. It is thus possible to correct an operator's mistake without the necessity of setting back the counters or making other troublesome manipulations. The buttons which operate the clearing and totaling keys or buttons, are indicated at 48 and 49.

Another advantage of the invention resides in the fact that the counter attachment may be readily disconnected and thrown out of commission by simply uncoupling the connection between the link 9 and the extension crank 10. This is effected by withdrawing the knurled pin 50. When so disconnected, the accounting machine can be used precisely the same as an ordinary accounting machine not equipped with a counter attachment.

This application is a continuation of my prior application Serial No. 654,442, filed October 13, 1911.

It will of course be understood that the details of construction, arrangement, and operation of the mechanism can be modified very considerably without departing from the invention. Accordingly, I do not wish the appended claims to be construed narrowly, except in so far as they are made specific.

I claim—

1. The combination of a change machine and a detachable counter structure comprising registering mechanism, said counter structure adapted to replace the coin magazine structure of said machine, comprising a plurality of counters arranged in two rows, one above the other, a plurality of pivotally mounted levers in the path of the ejector devices of the change machine and having slots therein, arms each having a pin thereon adapted to be engaged by said levers to move the arms to operate the counters.

2. In a coin ejecting structure, a coin magazine mechanism, a unitary counter structure, and means for quickly attaching and detaching either the coin magazine mechanism or the counter structure, said means consisting of a pair of screw studs having their inner screw-threaded ends capable of insertion into suitable threaded apertures located in the ejector structure, and having their outer ends projecting beyond the outer face of either of said attachable devices when said devices are in position, said studs having thumb nuts on their outer ends for readily operating said studs to quickly attach or detach either of said attachable devices.

3. In combination with a coin ejector device, coin ejector bars, interchangeable devices adapted to be operated by said coin ejector bars, and means for quickly attaching either of said devices to the coin ejector device, said attaching means comprising a pair of screw studs adapted to have their ends threaded into the coin ejector structure and their heads projecting beyond the front of either of said interchangeable devices when either of said devices is in position, and thumb nuts for said screw studs whereby the studs may be easily removed to permit the changing of said interchangeable devices.

4. In combination, a calculating machine functionally complete in and by itself for performing accounting functions, said machine having manually operable keys, accounting devices adapted to be preliminarily selected by said keys for subsequent selective actuation, and having also a main actuating member common to all keys and adapted to operate the accounting mechanism selectively pre-set for operation, an ejector mechanism organzed as an individual structure and physically detachable from the accounting machine, a support, coin magazine structure having coin receptacles and adapted to be applied to said support, counter structure containing registering devices and adapted to be applied to said support in lieu of the coin structure; and interconnections between said calculating machine and said ejector mechanism whereby actuation of the former in its accounting capacity first effects selection of ejector bars of the ejector mechanism and thereafter effects operation of the structure carried by said support; in an amount corresponding to the amount set up on the keys of the accounting machine.

5. In combination, a calculating machine of the decimal adding type provided with a set of manually operable keys and accounting devices adapted to be preliminarily set by said keys for subsequent selective actuation, paying mechanism including ejecting devices adapted to be preliminarily selected by said keys for subsequent effective operation, a main actuating mechanism common to all of said keys and capable of operating concurrently the accounting devices and the ejecting devices and including a disconnecting means for disabling the ejecting devices while maintaining operative the accounting devices, and registering counter mechanism adapted for association with, and operation by, the ejecting devices, whereby actuation of the calculating machine in its accounting capacity first effects selection of ejecting devices and thereafter operates the registering devices.

6. In a machine of the class described, the combination of keys bearing indicia and adapted for setting up predetermined amounts, means for accumulating the amounts set up by the keys on operation thereof, and means operable as an incident to the accumulation of amounts for determining the number of units of different denominations of money required to make up each amount accumulated by the accumulating means aforesaid.

7. The combination with an adding machine comprising an accumulating mechanism and manipulating devices controlling the setting up of amounts to be accumulated, of denominational counters, and means for operating the counters automatically and incident to the operation of the accumulating mechanism to determine the number of units of different denominations or values necessary to make up each amount set up by the manipulative devices for accumulation.

8. In a machine of the class described, the combination of an adding machine, counting mechanism separate from said machine, means to control action of the counting mechanism incident to controlling of the operation of the adding machine, and means to operate the adding machine and counting mechansm conjointly and one of them alone.

9. In a machine of the class described, the combination with an adding machine comprising keyboard manipulative devices, accumulating mechanism controlled by said devices, an actuator for the accumulating mechanism, a plurality of counters, selector means intermediate the counters and manipulative devices aforesaid, and means to render the counters operative and inoperative with respect to the actuator.

10. In a machine of the class described, the combination of a plurality of counting devices, an actuator associated with each counting device, operating means for the actuators normally inoperative relative thereto, and means for initially selecting one or more of the actuators to render the same operative in respect to said operating means, and accounting mechanism including accounting instrumentalities adapted for preliminary selection by the aforesaid selecting means, and, operating means for said instrumentalities actuated from the above mentioned operating means 11. In combination, a set of manually-operable keys, totalling mechanism controlled by said keys, denomination selectors settable by said keys, a common actuator for effectively operating said totalling mechanism and said denomination selectors after operation of the keys, and denomination counters operated by said selectors.

12. In combination, a set of manually-operable keys, totalling mechanism controlled by said keys, denomination selectors settable by said keys, a common actuator for effectively operating said totalling mechanism and said denomination selectors after operation of the keys, the arrangement including means operated by the common actuator and engageable with the set selectors for operating the latter.

13. In combination, a set of manually-operable keys, totalling mechanism controlled by said keys, denomination selectors settable by said keys, a common actuator for effectively operating said totalling mechanism and said denomination selectors after operation of the keys, and denomination counters operated by said selectors, the arrangement including means operated by the common actuator and engageable with the set selectors for operating the latter.

14. In combination, a set of mannually-operable keys, totalling mechanism controlled by said keys, denomination selectors settable by said keys, a common actuator for effectively operating said totalling mechanism and said denomination selectors after operation of the keys, and denomination counters operated by said selectors; the arrangement including a bail operated by the common actuator and engagable with the set selectors for operating the latter.

15. In combination, a set of manually-operable keys, listing and totalling mechanism controlled by said keys, denomination selectors settable by said keys, denomination counters operable by said selectors, a common actuator for effectively operating said totalling mechanism in accordance with the amount set up on said keys and simultaneously operating the denomination counters to indicate money units in number and amount necessary to make up the amount set up on said keys, the arrangement including an uncoupling device whereby the listing and totalling mechanism may be operated independently of the denomination mechanism at will.

16. In combination, a set of manually-operable keys, listing and totalling mechanism controlled by said keys, hooked denomination selectors settable by said keys, denomination counters operable by said selectors, and a common actuator for effectively operating said totalling mechanism in accordance with the amount set up on said keys and simultaneously operating the denomination counters to indicate money units in number and amount necessary to make up the amount set up on said keys, the arrangement including a bail operated by the common actuator and engageable with the selector hooks when the latter have been set by the keys.

17. In combination, a set of manually-operable keys, listing and totalling mechanism controlled by said keys, hooked denomination selectors settable by said keys, denomination counters operable by said selectors, a common actuator for effectively operating said totalling mechanism in accordance with the amount set up by said keys and simultaneously operating the denomination counters to indicate money units in number and amount necessary to make up the amount set up on said keys, the arrangement including a bail operated by the common actuator and engageable with the selector hooks when the latter have been set by the keys, and means whereby the common actuator may at will be operated without actuating said bail.

18. In combination, an adding machine of the decimal type provided with a plurality of series of manually-operable keys, a totalling and listing mechanism controlled by said keys, a plurality of rows of keys superposed over the adding machine keys and arranged to actuate the latter, denomination selectors controlled by the second set of keys, and a common actuating means connected with the denomination selectors and with the adding machine for simultaneously actuating the denomination selectors and the adding and listing mechanisms in accordance with an amount set up on said upper keys.

19. In combination, an adding machine of the decimal type provided with a plurality of series of manually-operable keys, a totalling and listing mechanism controlled by said keys, a plurality of rows of keys superposed over the adding machine keys and arranged to actuate the latter, denomination selectors controlled by the second set of keys, and a common actuating means connected with the denomination selectors and with the adding machine for simultaneously actuating the denomination selectors and the adding and listing mechanisms in accordance with an amount set up on said upper keys, the arrangement including a disconnecting device whereby the adding and listing machine may be operated without operating the denomination selectors.

20. In combination, an adding machine of the decimal type provided with a plurality of series of manually-operable keys, a totalling and listing mechanism controlled by said keys, a plurality of rows of keys superposed over the adding machine keys and arranged to actuate the latter, denomination selectors controlled by the second set of keys, and a common actuating means connected with the denomination selectors, and with the adding machine for simultaneously actuating the denomination selectors and the adding and listing mechanisms in accordance with an amout set up on said upper keys, the upper keys and denomination selectors being organized in a unit detachable from the adding machine whereby the latter may be operated to add and list in the absence of the other unit.

21. In a machine of the class described, the combination of keys bearing indicia and adapted for setting up predetermined amounts, means for accumulating the amounts set up by the keys on operation thereof, and means for determining the number of units of different denominations of money required to make up each amount accumulated by the accumulating means aforesaid.

22. The combination with an adding machine comprising accumulating mechanism and manipulative devices controlling the setting up of amounts to be accumulated, of denominational counters, means for operating the counters automatically and incident to the operation of the accumulating mechanism to determine the number of units of different denominations or values necessary to make up each amount set up by the manipulative devices for accumulation, and means for discontinuing the operation of said counters for permitting independent operation of the adding machine.

23. The combination with an adding machine comprising accumulating mechanism and means for listing amounts accumulated by said mechanism, manipulative keys for setting up amounts to be accumulated and listed, and a main actuator for effecting operation of the accumulating and listing instrumentalities, of a plurality of counters each adapted for counting units of different values or denominations going to make up the various amounts accumulated and listed by the adding machine, selector means intermediate the manipulative keys and said counters, and means for operating the counters from the main actuator in accordance with the action of the selector means.

24. The combination with an adding machine comprising accumulating mechanism and means for listing amounts accumulated by said mechanism, manipulative keys for setting up amounts to be accumulated and listed, and a main actuator for effecting operation of the accumulating and listing instrumentalities, of a plurality of counters each adapted for counting units of different values or denominations going to make up the various amounts accumulated and listed by the adding machine, selector means intermediate the manipulative keys and said counters, means whereby to operate the counters automatically and as an incident to the operation of the accumulating and listing means by the main actuator, and means to disable the counters.

25. In a machine of the class described, the combination of an adding machine, counting mechanism separate from said machine, means to control action of the counting mechanism incident to controlling of the operation of the adding machine, means to operate the adding machine and counting mechanism conjointly and one of them alone, including means to disable the counting mechanism without affecting the operativeness of the adding machine as such.

26. In a machine of the class described, the combination of an adding machine, counting mechanism separate from said machine comprising a plurality of counters, means to control the action of one or more of said counters incident to setting up amounts on the adding machine, and means to operate the adding machine and counting mechanism conjointly, or one of them alone.

27. In a machine of the class described, the combination of an adding machine comprising suitable normalizing mechanism, counting mechanism separate from said machine, means to operate the adding machine and counting mechanism conjointly, and one of them alone, and separate means for normalizing the counting mechanism.

28. The combination with an adding machine comprising amount accumulating mechanism, manipulative devices for setting up different amounts below a predetermined maximum to be accumulated by said machine, a plurality of counters each adapted for counting units of a certain value or denomination of which any amount set upon the machine may be comprised in whole or part, means intermediate the manipulative devices and said counters whereby to control operation of one or more of the counters required to be operated to indicate the number of units of different values or denominations making up the predetermined amount controlled by an operated manipulative device, and operating means for the accumulating means and counters.

29. In a machine of the class described, the combination of a plurality of counting devices, an actuator for each of said devices, and means for selecting and operating one or more of the actuators, and accounting mechanism controlled by said selecting means.

30. In combination a set of manually operable keys, totalling mechanism controlled by said keys, denomination selectors settable by said keys, a common actuator for effectively operating said totalling mechanism and said denomination selectors, after operation of the keys, the arrangement including means operated by the common actuator and engageable with the set selectors for operating the latter and uncoupling means whereby the totalling mechanism may be operated independently of the selectors.

31. In combination, a set of manually operable keys, totalling mechanism controlled by said keys, denomination selectors settable by said keys, and common actuator for effectively operating said totalling mechanism and said denomination selectors after operation of the keys, the arrangement including a bail operated by the common actuator and engageable with the set selectors for operating the latter.

32. In combination, a set of manually operable keys, listing and totalling mechanism controlled by said keys, denomination selectors settable by said keys, a common actuator for effectively operating said totalling mechanism in accordance with the amount set up on said keys and engageable with the set selectors after operation of the keys for simultaneously effecting operation of the selectors to select the denominations of money units in number and amount necessary to make up the amount set up on said keys, the arrangement including an uncoupling device whereby the listing and totalling mechanism may be operated independently of the denomination mechanism at will.

33. In combination, a set of manually operable keys, listing and totalling mechanism controlled by said keys, hooked denomination selectors settable by said keys, and a common actuator for effectively operating said totalling mechanism in accordance with the amount set up on said keys and simultaneously operating the selectors to select denominations of money units in number and amount necessary to make up the amount set up on said keys, the arrangement including a bail operated by the common actuator and engageable with the selector hooks when the latter have been set by the keys.

34. In combination, a set of manually operable keys, listing and totalling mechanism controlled by said keys, hooked denomination selectors settable by said keys, a common actuator for effectively operating said listing and totalling mechanism in accordance with the amount set up by said keys and simultaneously operating the selectors to select denominations of money units in number and amount necessary to make up the amount set up on said keys, the arrangement including a bail operated by the common actuator and engageable with the selector hooks when the latter have been set by the keys, and means whereby the common actuator may at will be operated without actuating said bail.

NELSON C. OVAITT.